(12) United States Patent
Vernacchia et al.

(10) Patent No.: US 9,050,981 B2
(45) Date of Patent: Jun. 9, 2015

(54) SYSTEM AND METHOD FOR PROVIDING FAULT MITIGATION FOR VEHICLE SYSTEMS HAVING HIGH AND LOW SIDE DRIVERS

(71) Applicant: GM GLOBAL TECHNOLOGY OPERATIONS LLC, Detroit, MI (US)

(72) Inventors: Mark A. Vernacchia, Northville, MI (US); Jenna C. Pechauer, Fenton, MI (US)

(73) Assignee: GM Global Technology Operations LLC, Detroit, MI (US)

(*) Notice: Subject to any disclaimer, the term of this patent is extended or adjusted under 35 U.S.C. 154(b) by 285 days.

(21) Appl. No.: 13/654,466

(22) Filed: Oct. 18, 2012

(65) Prior Publication Data

US 2014/0114510 A1 Apr. 24, 2014

(51) Int. Cl.
*B60L 9/00* (2006.01)
*B60L 11/00* (2006.01)
*G05D 1/00* (2006.01)
*G05D 3/00* (2006.01)
*G06F 7/00* (2006.01)
*G06F 17/00* (2006.01)
*B60W 50/02* (2012.01)

(52) U.S. Cl.
CPC ............. *B60W 50/02* (2013.01); *Y02T 10/7275* (2013.01)

(58) Field of Classification Search
CPC ........................... B60W 50/02; Y02T 10/7275

USPC .......................................... 701/22, 29.2, 107
See application file for complete search history.

(56) References Cited

U.S. PATENT DOCUMENTS

| 8,000,859 | B2 | 8/2011 | Koski et al. | |
|---|---|---|---|---|
| 2001/0048367 | A1* | 12/2001 | Wimmer et al. | 340/661 |
| 2006/0122713 | A1* | 6/2006 | Miller et al. | 700/21 |
| 2009/0088279 | A1* | 4/2009 | Martini et al. | 475/5 |
| 2010/0269793 | A1 | 10/2010 | Wang et al. | |
| 2013/0151919 | A1* | 6/2013 | Huynh | 714/746 |
| 2014/0004994 | A1* | 1/2014 | Wang et al. | 477/4 |

* cited by examiner

*Primary Examiner* — Calvin Cheung
*Assistant Examiner* — Paula L Schneider
(74) *Attorney, Agent, or Firm* — Quinn Law Group, PLLC

(57) ABSTRACT

A system and method for providing fault mitigation in a vehicle system having high side drivers (HSDs) and low side drivers (LSDs) are provided. The system includes a first HSD and a plurality of first LSDs. The system also includes a selected first plurality of actuators, with each actuator connected to the first HSD and connected to a respective one of the first LSDs to operate in a first operational mode. The system further includes a second HSD and a plurality of second LSDs. The system also includes a selected second plurality of actuators, with each actuator connected to the second HSD and connected to a respective one of the second LSDs to operate in a second operational mode. When a failed component sets a fault, the corresponding HSD is turned off and the other HSD is turned on, enabling the vehicle system to operate in the non-faulted operational mode.

20 Claims, 5 Drawing Sheets

SYSTEM AND METHOD FOR PROVIDING FAULT MITIGATION FOR VEHICLE SYSTEMS HAVING HIGH AND LOW SIDE DRIVERS

TECHNICAL FIELD

The present invention relates to a system and method for providing fault mitigation for electric/hybrid vehicle systems having high and low side drivers.

BACKGROUND

Actuators, such as solenoids, pumps, valve assemblies, servo motors, or relays, may be used in various vehicle systems such as in propulsion systems, emissions systems, air management systems, or other vehicle systems for operating devices, such as clutches, brakes or valves. In a propulsion system, a solenoid may engage or disengage a gear or a clutch. In an emissions system, a solenoid may regulate exhaust gas entering an intake manifold. In an air management system, a valve assembly may divert airflow and/or vacuum. In the control of such vehicle systems, electric power may be provided to an actuator through a power module having high and low side drivers. High and low side drivers may be solid-state switches such as metal-oxide semiconductor field-effect transistors (MOSFETs). Regardless of the particular switch technology used, in the high side driver, the switch allows a current to flow from a power supply (high potential) to an actuator. In the low side driver, the switch allows a current to flow from the actuator to a low potential, such as ground.

In some power modules, the high side driver has a current rating sufficient to power multiple actuators. Typically, multiple actuators are connected to one high side driver until it reaches capacity (generally due to the current draw of the actuators). Then another high side driver is added to the power module until all necessary actuators are connected through a high side driver. Each actuator is also connected to a separate low side driver. When a fault occurs in an actuator, connected low side driver, or an associated device (referred to generally as a failed component) in such a vehicle system, an algorithm in the power module or other controller generally sends a separate command to each of the low side drivers connected to the other actuators to turn on or off individually so as to minimize the impact of the failed component on vehicle operation. Since there are multiple actuators, low side drivers, and devices in each vehicle system, many control commands may be required to put a vehicle in a desired operational mode while isolating the failed component, leading to slow and complex fault mitigation systems.

SUMMARY

A system and method for providing fault mitigation in a vehicle system having high side drivers (HSDs) and low side drivers (LSDs) are provided. The system includes a first HSD operable to supply power when turned on and to disconnect power when turned off and a plurality of first LSDs associated with the first HSD. The system also includes a selected first plurality of actuators, with each actuator connected to the first HSD and connected to a respective one of the plurality of first LSDs to receive power and operate in a first operational mode of the vehicle system. The system further includes a second HSD operable to supply power when turned on and to disconnect power when turned off and a plurality of second LSDs associated with the second HSD. The system also includes a selected second plurality of actuators, with each actuator connected to the second HSD and connected to a respective one of the plurality of second LSDs to receive power and operate in a second operational mode of the vehicle system. The system of the present invention further includes that when one of the selected first plurality of actuators and respectively connected LSD sets a fault, the first HSD is turned off thereby disconnecting power to the selected first plurality of actuators and respectively connected LSDs and the second HSD is turned on, enabling the vehicle system to operate in the second operational mode; and that when one of the selected second plurality of actuators and respectively connected LSD sets a fault, the second HSD is turned off thereby disconnecting power to the selected second plurality of actuators and respectively connected LSDs and the first HSD is turned on, enabling the vehicle system to operate in the first operational mode.

A method for providing fault mitigation in a vehicle system having a first high side driver (HSD) operable to supply power when turned on and to disconnect power when turned off and a plurality of first low side drivers (LSDs) and a second HSD operable to supply power when turned on and to disconnect power when turned off and a plurality of second LSDs is provided. The method includes connecting the first HSD to a selected first plurality of actuators, so that each actuator of the selected first plurality of actuators is connected to the first HSD and to a respective one of the plurality of first LSDs to receive power and operate in a first operational mode of the vehicle system. The method also includes connecting the second HSD to a selected second plurality of actuators, so that each actuator of the selected second plurality of actuators is connected to the second HSD and to a respective one of the plurality of second LSDs to receive power and operate in a second operational mode of the vehicle system. The method further includes that when one of the selected first plurality of actuators and respectively connected LSD sets a fault, the first HSD is turned off thereby disconnecting power to the selected first plurality of actuators and respectively connected LSDs and the second HSD is turned on, enabling the vehicle system to operate in the second operational mode; and when one of the selected second plurality of actuators and respectively connected LSD sets a fault, the second HSD is turned off thereby disconnecting power to the selected second plurality of actuators and respectively connected LSDs and the first HSD is turned on, enabling the vehicle system to operate in the first operational mode.

An electric/hybrid vehicle including a propulsion system having a system for providing fault mitigation using HSDs and LSDs in accordance with the present invention is provided.

In another embodiment of the system of the present invention, a third HSD operable to supply power when turned on and to disconnect power when turned off and a plurality of third LSDs associated with the third HSD is provided. The system also includes a selected third plurality of actuators with each of the selected third plurality of actuators being connected to the third HSD and being connected to a respective one of the plurality of third LSDs to receive power and operate in a third operational mode of the vehicle system. When one of the selected third plurality of actuators and respectively connected LSD sets a fault, the third HSD is turned off thereby disconnecting power to the selected third plurality of actuators and respectively connected LSDs and at least one of the first and second HSDs is turned on, enabling the vehicle system to operate in at least one of the first and second operational modes.

The above features and advantages and other features and advantages of the present invention are readily apparent from the following detailed description of the best modes for carrying out the invention when taken in connection with the accompanying drawings.

DETAILED DESCRIPTION

Figure 1:
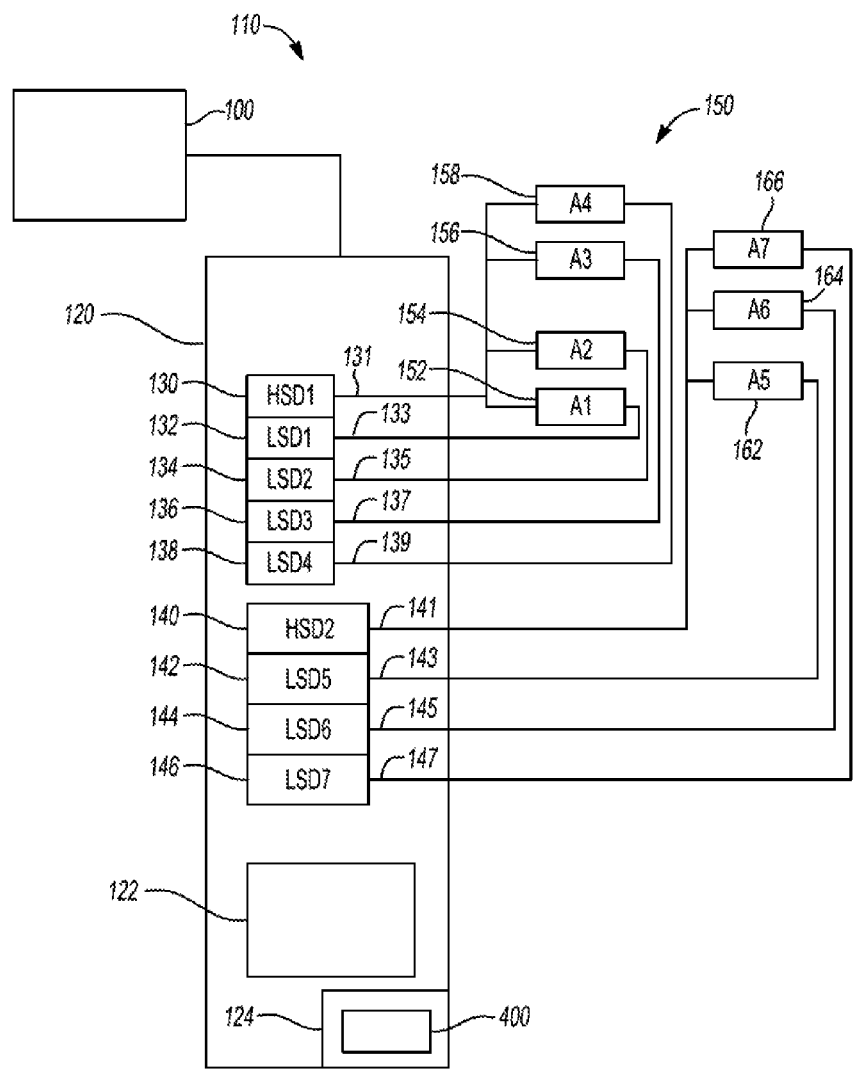
FIG. 1 is a functional block diagram of a vehicle controller and a vehicle system for an electric/hybrid vehicle including an embodiment of the system and method for providing fault mitigation in accordance with the present invention.

Referring to the drawings, wherein like characters represent the same or corresponding parts throughout the several view, FIG. 1 is a functional block diagram of a vehicle controller 100 and a vehicle system 110 for use in an electric/hybrid vehicle (not shown in FIG. 1) including an embodiment of the system and method of the present invention. A vehicle controller 100, such as a vehicle control module, an electronic control module or other control module, accepts inputs such as passenger inputs and provides instruction and communication among the many vehicle systems. The vehicle controller 100 is in communication with a vehicle system 110 such as for a propulsion system, an emissions system, an air management system, or another vehicle system. The vehicle system 110 may include various controllers, modules, actuators and devices necessary to provide a specific system as desired. The vehicle system 110 includes a power module 120 for connecting and providing power to system components 150 including actuators A1 152, A2 154, A3 156, A4 158, A5 162, A6 164, A7 166 (described here-in-below) to carry out desired functions. The power module 120 includes HSD1 130 associated with LSD1 132, LSD2 134, LSD3 136, and LSD4 138. The power module 120 also includes HSD2 140 associated with LSD5 142, LSD6 144, and LSD7 146. The power module 120 may also include additional controls 122. The power module 120 includes a microprocessor 124 or central processing unit and may include fault mitigation algorithm 400 stored in Read Only Memory (ROM), Random Access Memory (RAM), electrically programmable read only memory (EPROM) or similar systems. Alternatively fault mitigation algorithm 400 may be stored in another controller as long as it is connected for use as described here-in-below.

As shown in FIG. 1, first generally described as an overview and then specifically referring to the numbered components, each HSD and associated LSD respectively has an HSD output (HSDO) and an LSD output (LSDO), respectively, connected to an actuator enabling current to flow from a high potential through the actuator to a low potential (thus enabling the actuator to receive power and operate) when both the HSD and the associated LSD are turned ON. If either the HSD or the associated LSD is turned OFF, the actuator does not receive power for operating and is also turned OFF. Specifically, HSD1 130 has an output HSD1O 131 and LSD1 132 has an output LSD1O 133 enabling current to flow through A1 152 so that A1 152 is turned ON when both HSD1 130 and LSD1 132 are turned ON and current flows through HSD1O 131 and LSD1O 133 respectively. If either HSD1 130 or LSD1 132 is turned OFF, then A1 152 is accordingly turned OFF. HSD1 130 has an output HSD1O 131 and LSD2 134 has an output LSD2O 135 enabling current to flow through A2 154 so that A2 154 is turned ON when both HSD1 130 and LSD2 134 are turned ON and current flows through HSD1O 131 and LSD2O 135 respectively. If either HSD1 130 or LSD2 134 is turned OFF, then A2 154 is accordingly turned OFF. HSD1 130 has an output HSD1O 131 and LSD3 136 has an output LSD3O 137 enabling current to flow through A3 156 so that A3 156 is turned ON when both HSD1 130 and LSD3 136 are turned ON and current flows through HSD1O 131 and LSD3O 137 respectively. If either HSD1 130 or LSD3 136 is turned OFF, then A3 156 is accordingly turned OFF. HSD1 130 has an output HSD1O 131 and LSD4 138 has an output LSD4O 139 enabling current to flow through A4 158 so that A4 158 is turned ON when both HSD1 130 and LSD4 138 are turned ON and current flows through HSD1O 131 and LSD4O 139 respectively. If either HSD1 130 or LSD4 138 is turned OFF, then A4 158 is accordingly turned OFF.

HSD2 140 has an output HSD2O 141 and LSD5 142 has an output LSD5O 143 enabling current to flow through A5 162 so that A5 162 is turned ON when both HSD2 140 and LSD5 142 are turned ON and current flows through HSD2O 141 and LSD5O 143 respectively. If either HSD2 140 or LSD5 142 is turned OFF, then A5 162 is accordingly turned OFF. HSD2 140 has an output HSD2O 141 and LSD6 144 has an output LSD6O 145 enabling current to flow through A6 164 so that A6 164 is turned ON when both HSD2 140 and LSD6 144 are turned ON and current flows through HSD2O 141 and LSD6O 145 respectively. If either HSD2 140 or LSD6 144 is turned OFF, then A6 164 is accordingly turned OFF. HSD2 140 has an output HSD2O 141 and LSD7 146 has an output LSD7O 147 enabling current to flow through A7 166 so that A7 166 is turned ON when both HSD2 140 and LSD7 146 are turned ON and current flows through HSD2O 141 and LSD7O 147 respectively. If either HSD2 140 or LSD7 146 is turned OFF, then A7 166 is accordingly turned OFF.

Still referring to FIG. 1, the system components 150 include the actuators A1 152, A2 154, A3 156, A4 158, A5 162, A6 164, A7 166, which may be solenoids, for carrying out desired functions by engaging devices (also referred to as associated devices) in a given system, such as engaging gears or clutches in a propulsion system or operating valves in an air management system to provide airflow or vacuum. In accordance with the present invention, the actuators A1 152, A2 154, A3 156 and A4 158 connected to HSD1 130 via HSD1O 131 and associated LSD1 132 via LSD1O 133, LSD2 134 via LSD2O 135, LSD3 136 via LSD3O 137, and LSD4 138 via LSD4O 139 respectively, are selectively connected (as described above) to operate in a first operational mode. Also in accordance with the present invention, the actuators A5 162, A6 164, and A7 166 connected to HSD2 140 via HSD2O 141 and associated LSD5 142 via LSD5O 143, LSD6 144 via LSD6O 145 and LSD7 146 via LSD7O 147, respectively, are selectively connected (as described above) to operate in a second operational mode. It is noted that HSD1 130 may have the current rating to provide power for all of the actuators A1 152, A2 154, A3 156, A4 158, A5 162, A6 164, and A7 166 and, in a traditional vehicle system, all of the actuators would have been connected to a single HSD. However, in accordance with the present invention, the actuators A1 152, A2 154, A3 156 and A4 158 are selectively connected to HSD1 130 to operate in a first operational mode when HSD1 130 is turned ON. Also in accordance with the present invention, the actuators A5 162, A6 164 and A7 166 are selectively connected to HSD2 140 to operate in a second operational mode when HSD2 140 is turned ON. This selection enables the fault mitigation algorithm 400 of the present invention to quickly place the vehicle system 110 in a desired operational mode by turning off a specific HSD associated with an actuator, connected LSD, or associated device which sets a fault (in the microprocessor 124, for example) indicating a component failed. Thus the operational mode which the vehicle system 110 is placed in is capable of operating in the electric/hybrid vehicle (not shown in FIG. 1) despite the failed component.

Figure 2:
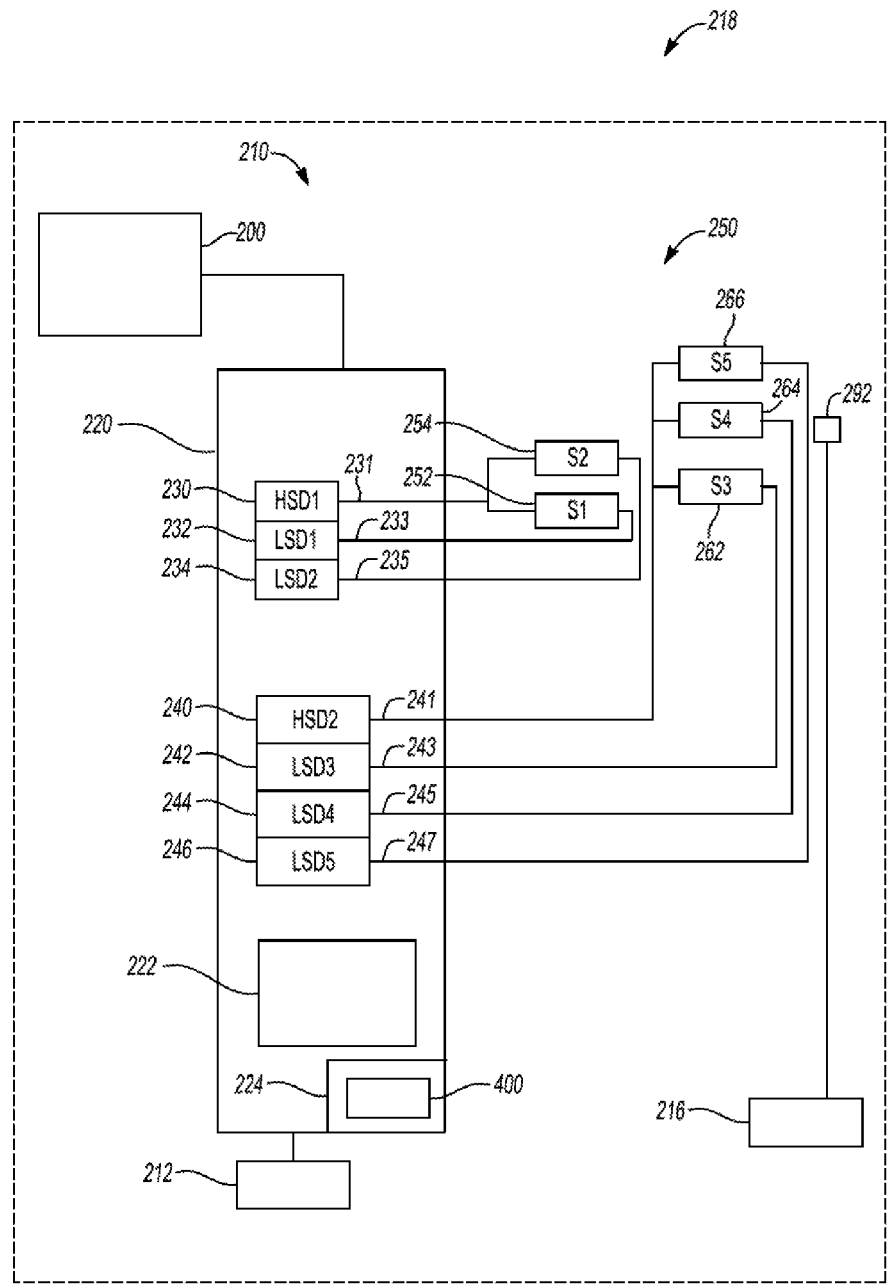
FIG. 2 is a functional block diagram of a vehicle controller and an exemplary propulsion system for an electric/hybrid vehicle including the system and method for providing fault mitigation in accordance with the present invention.

With reference to FIG. 2, an exemplary embodiment of a propulsion system 210 of an electric/hybrid vehicle 218 including the system and method for fault mitigation in accordance with the present invention is shown. The electric/hybrid vehicle 218 may be a hybrid vehicle or a fully electric vehicle and may include a battery or an energy storage system (ESS) 212 to provide and/or store electric power for propelling the electric/hybrid vehicle 218. The electric/hybrid vehicle 218 includes a vehicle controller 200 in electrical connection with a propulsion system 210 for propelling vehicle wheels 216. The propulsion system 210 includes a power module 220. The power module 220 connects and provides power to system components 250 including solenoids S1 252, S2 254, S3 262, S4 264, S5 266 (described here-in-below) using high and associated low side drivers to carry out desired functions or engage system devices. The power module 220 includes a microprocessor 224 or central processing unit and may include fault mitigation algorithm 400 stored in Read Only Memory (ROM), Random Access Memory (RAM), electrically programmable read only memory (EPROM) or similar systems. Alternatively fault mitigation algorithm 400 may be stored in another controller as long as it is connected for use as described here-in-below. The power module 220 may also include additional controls such as motor controls 222.

The power module 220 includes HSD1 230 associated with LSD1 232 and LSD2 234. The power module 220 also includes HSD2 240 associated with LSD3 242, LSD4 244, and LSD5 246. HSD1 230 has an output HSD1O 231 and LSD1 232 has an output LSD1O 233 enabling current to flow through S1 252 so that S1 252 is turned ON when both HSD1 230 and LSD1 232 are turned ON and current flows through HSD1O 231 and LSD1O 233 respectively. If either HSD1 230 or LSD1 232 is turned OFF, then S1 252 is accordingly turned OFF. HSD1 230 has an output HSD1O 231 and LSD2 234 has an output LSD2O 235 enabling current to flow through S2 254 so that S2 254 is turned ON when both HSD1 230 and LSD2 234 are turned ON and current flows through HSD1O 231 and LSD2O 235 respectively. If either HSD1 230 or LSD2 234 is turned OFF, then S2 252 is accordingly turned OFF. HSD2 240 has an output HSD2O 241 and LSD3 242 has an output LSD3O 243 enabling current to flow through S3 262 so that S3 262 is turned ON when both HSD2 240 and LSD3 242 are turned ON and current flows through HSD2O 241 and LSD3O 243 respectively. If either HSD2 240 or LSD3 242 is turned OFF, then S3 262 is accordingly turned OFF. HSD2 240 has an output HSD2O 241 and LSD4 244 has an output LSD4O 245 enabling current to flow through S4 264 so that S4 264 is turned ON when both HSD2 240 and LSD4 244 are turned ON and current flows through HSD2O 241 and LSD4O 245 respectively. If either HSD2 240 or LSD4 244 is turned OFF, then S4 264 is accordingly turned OFF. HSD2 240 has an output HSD2O 241 and LSD5 246 has an output LSD5O 247 enabling current to flow through S5 266 so that S5 266 is turned ON when both HSD2 240 and LSD5 246 are turned ON and current flows through HSD2O 241 and LSD5O 247 respectively. If either HSD2 240 or LSD5 246 is turned OFF, then S5 266 is accordingly turned OFF.

Still referring to FIG. 2, the propulsion system 210 includes propulsion components 250. The propulsion components 250 include solenoids S1 252, S2 254, S3 262, S4 264, S5 266 for engaging gears or clutches (associated devices, not shown) to connect through a final drive 292 to propel vehicle wheels 216 of the electric/hybrid vehicle 218. In accordance with the present invention, S1 252 and S2 254 which are connected to HSD1 230 and associated LSD1 232 and LSD2 234, respectively, are selectively connected to operate in a first operational mode. Also in accordance with the present invention, S3 262, S4 264, and S5 266 which are connected to HSD2 240 and associated LSD3 242, LSD4 244 and LSD5 246, respectively, are selectively connected to operate in a second operational mode.

Figure 3:
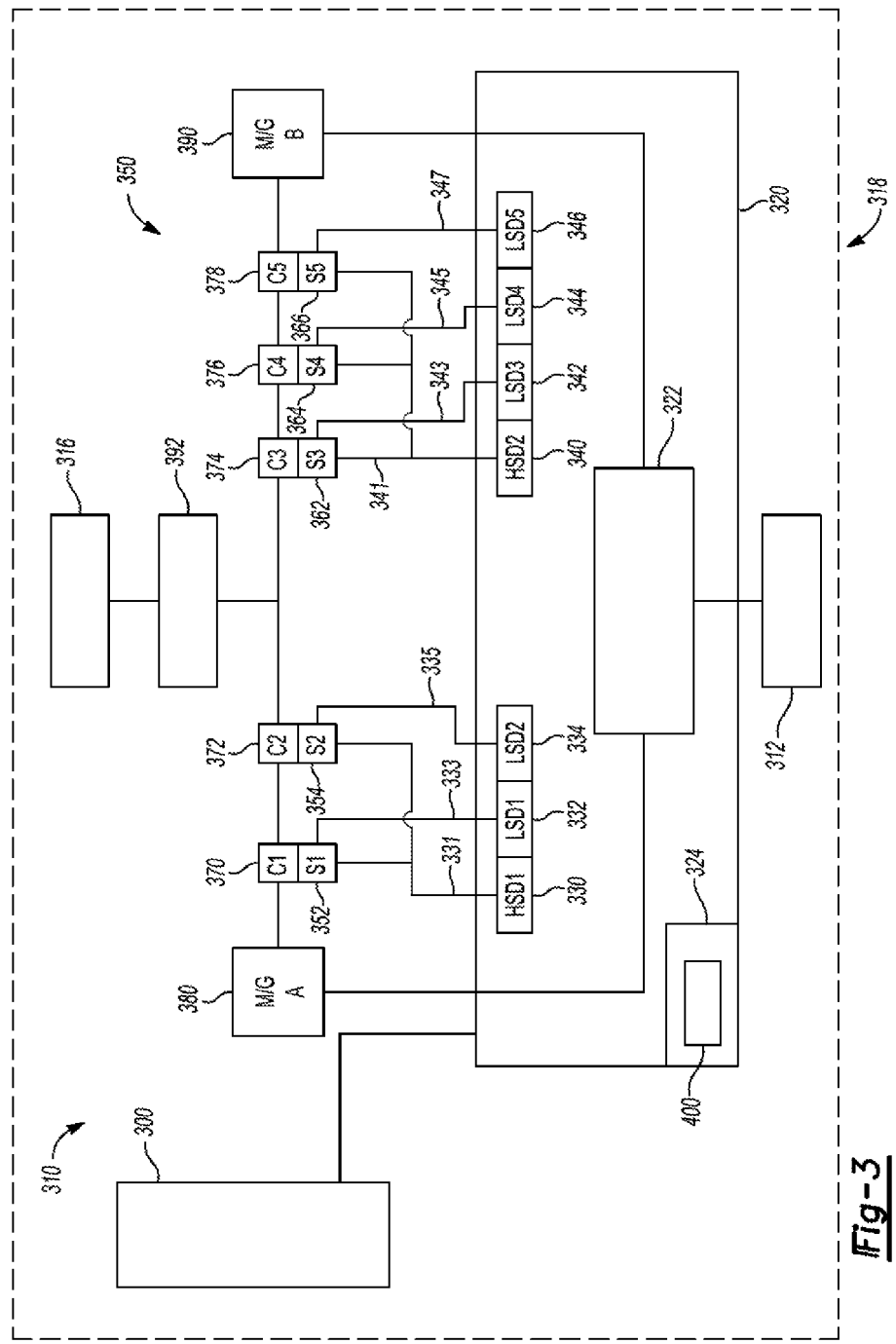
FIG. 3 is a functional block diagram of the vehicle controller and the exemplary propulsion system shown in FIG. 2 providing a first drive operational mode and a second drive operational mode for an electric/hybrid vehicle in accordance with the present invention.

With reference to FIG. 3, an exemplary embodiment of a propulsion system 310 of an electric/hybrid vehicle 318 including the system and method of the present invention is shown. The electric/hybrid vehicle 318 may be a hybrid vehicle or a fully electric vehicle and may include a battery or an energy storage system (ESS) 312 to provide and/or store electric power for propelling the electric/hybrid vehicle 318. The electric/hybrid vehicle 318 includes a vehicle controller 300 in electrical connection with a propulsion system 310 for propelling vehicle wheels 316. The propulsion system 310 includes a power module 320. The power module 320 connects and provides power to electro-hydraulic solenoids S1 352, S2 354, S3 362, S4 364, S5 366 that channel hydraulic pressure to associated devices such as clutches C1 370, C2 372, C3 374, C4 376, C5 378, respectively. The power module 320 includes a microprocessor 324 or central processing unit and may include fault mitigation algorithm 400 stored in Read Only Memory (ROM), Random Access Memory (RAM), electrically programmable read only memory (EPROM) or similar systems. Alternatively fault mitigation algorithm 400 may be stored in another controller as long as it is connected for use as described here-in-below. The power module 320 may also include additional controls such as motor controls 322 for directing two independent motor/generator units M/GA 380 and M/GB 390.

The power module 320 includes HSD1 330 associated with LSD1 332 and LSD2 334 and connected to S1 352 and S2 354, respectively. The power module 320 also includes HSD2 340 associated with LSD3 342, LSD4 344, and LSD5 346 and connected to S3 362, S4 364, S5 366, respectively. HSD1 330 has an output HSD1O 331 and LSD1 332 has an output LSD1O 333 enabling current to flow through S1 352 so that S1 352 is turned ON when both HSD1 330 and LSD1 332 are turned ON and current flows through HSD1O 331 and LSD1O 333 respectively. If either HSD1 330 or LSD1 332 is turned OFF, then S1 352 is accordingly turned OFF. HSD1 330 has an output HSD1O 331 and LSD2 334 has an output LSD2O 335 enabling current to flow through S2 354 so that S2 354 is turned ON when both HSD1 330 and LSD2 334 are turned ON and current flows through HSD1O 331 and LSD2O 335 respectively. If either HSD1 330 or LSD2 334 is turned OFF, then S2 354 is accordingly turned OFF. HSD2 340 has an output HSD2O 341 and LSD3 342 has an output LSD3O 343 enabling current to flow through S3 362 so that S3 362 is turned ON when both HSD2 340 and LSD3 342 are turned ON and current flows through HSD2O 341 and LSD3O 343 respectively. If either HSD2 340 or LSD3 342 is turned OFF, then S3 362 is accordingly turned OFF. HSD2 340 has an output HSD2O 341 and LSD4 344 has an output LSD4O 345 enabling current to flow through S4 364 so that S4 364 is turned ON when both HSD2 340 and LSD4 344 are turned ON and current flows through HSD2O 341 and LSD4O 345 respectively. If either HSD2 340 or LSD4 344 is turned OFF, then S4 364 is accordingly turned OFF. HSD2 340 has an output HSD2O 341 and LSD5 346 has an output LSD5O 347 enabling current to flow through S5 366 so that S5 366 is turned ON when both HSD2 340 and LSD5 346 are turned ON and current flows through HSD2O 341 and LSD5O 347 respectively. If either HSD2 340 or LSD5 346 is turned OFF, then S5 366 is accordingly turned OFF.

Still referring to FIG. 3, the propulsion system 310 includes propulsion components 350. The propulsion components 350 include electro-hydraulic solenoids S1 352, S2 354, S3 362, S4 364, S5 366 for channeling hydraulic pressure to clutches C1 370, C2 372, C3 374, C4 376, C5 378, respectively. Some of S1 352, S2 354, S3 362, S4 364, S5 366 and C1 370, C2 372, C3 374, C4 376, C5 378 transfer torque from either M/GA 380 or M/GB 390 to a final drive 392 to propel vehicle wheels 316 of the electric/hybrid vehicle 318 depending on the desired operational mode. In accordance with the present invention, S1 352 and S2 354 which are connected to HSD1 330 and associated LSD1 332 and LSD2 334, respectively, are selected to engage C1 370 and C2 372 to operate in a first operational mode which is a first gear state capable of enabling the electric/hybrid vehicle 318 to be propelled. Also in accordance with the present invention, S3 362, S4 364, and S5 366 which are connected to HSD2 340 and associated LSD3 342, LSD4 344 and LSD5 346, respectively, are selected to engage C3 374, C4 376, and C5 378 to operate in a second operational mode which is a second gear state capable of enabling the electric/hybrid vehicle 318 to be propelled. The propulsion system 310 can easily switch between first and second operational modes by either turning off HSD1 330 or HSD2 340. If any of S1 352, S2 354, LSD1 332, LSD2 334, C1 370 or C2 372 sets a fault (in the microprocessor 324, for example), the system of the present invention can quickly remediate by turning off HSD1 330 and turning on HSD2 340 thereby placing the propulsion system 310 in the second operational mode which does not include operation of the failed component. Additionally, if any of S3 362, S4 364, S5 366; LSD3 342, LSD4 344, LSD5 346; C3 374, C4 376, or C5 378 sets a fault (in the microprocessor 324, for example), the fault mitigation algorithm 400 of the present invention can quickly remediate by turning off HSD2 340 and turning on HSD1 330 thereby placing the propulsion system 310 in the first operational mode which does not include operation of the failed component. It should be appreciated that HSD1 330 may have a power rating to power all of S1 352, S2 354, S3 362, S4 364 and S5 366, but, in accordance with the present invention, the additional HSD2 340 is provided to power S3 362, S4 364 and S5 366 to enable the easy and fast change between independent operational modes.

A first exemplary scenario of the propulsion system 310 of FIG. 3 has HSD1 330, associated LSD1 332 and LSD2 334 and M/GA 380 turned on. This supplies power to S1 352 and S2 354 to engage C1 370 and C2 372 so that M/GA 380 drives the electric/hybrid vehicle 318 in the first operational mode. If one of S1 352, S2 354, LSD1 332, LSD2 334, C1 370, or C2 372 fails setting a fault in the microprocessor 324, the system quickly turns off HSD1 330 thereby isolating the failed component. Additionally, the system quickly turns on HSD2 340, powering S3 362, S4 364 and S5 366 which operate C3 374, C4 376 and C5 378, respectively, connecting M/GB 390 to drive the electric/hybrid vehicle 318 in the second operational mode which does not include the failed component. Obviously if all the solenoids were powered by one HSD, then each individual actuator would need to be turned on or off to isolate the effect of the failed component, taking time and adding complexity when a failed component is detected.

Still referring to FIG. 3, in a second exemplary scenario, the propulsion system 310 is operating in the first operational mode with HSD1 330, LSD1 332, LSD2 334, S1 352, S2 354, C1 370, and C2 372 all on or engaged. HSD2 340 is turned on and all the associated LSD3 342, LSD4 344, and LSD5 346 turned off so that S3 362, S4 364, S5 366, C3 374, C4 376 and C5 378, are not operating or engaged. If one of the LSD3 342, LSD4 344, LSD5 346, S3 362, S4 364, S5 366, C3 374, C4 376 and C5 378 should engage or turn on in a fault condition (setting a fault in the microprocessor 324), the fault mitigation algorithm 400 turns off HSD2 340 instead of having to isolate each component individually. Additionally the electric/hybrid vehicle 318 can still be propelled in the first operational mode because all of the components associated with HSD1 330 remain on while HSD2 340 is turned off, isolating the failed component.

A third exemplary scenario of the propulsion system 310 of FIG. 3 has the propulsion system 310 operating in the second operational mode with HSD2 340 on and LSD3 342, LSD4 344, LSD5 346, S3 362, S4 364, S5 366, C3 374, C4 376 and C5 378 are all either on or engaged. HSD1 330 is turned on and both the associated LSD1 332 and LSD2 334 turned off so that S1 352, S2 354, C1 370, and C2 372, are not operating or engaged. If one of the LSD1 332, LSD2 334, S1 352, S2 354, C1 370, or C2 372 should engage or turn on in a fault condition (setting a fault in the microprocessor 324), the system turns off HSD1 330 instead of having to isolate each component individually. Additionally the electric/hybrid vehicle 318 can still be propelled in the second operational mode because all of the components associated with HSD2 340 remain on while HSD1 330 is turned off, isolating the failed component. The system may then further isolate the failed component while the electric/hybrid vehicle 318 remains operating in a known operational mode. Obviously known default modes can be achieved quickly as only HSDs must be turned on or off to isolate a failed component.

Figure 4:
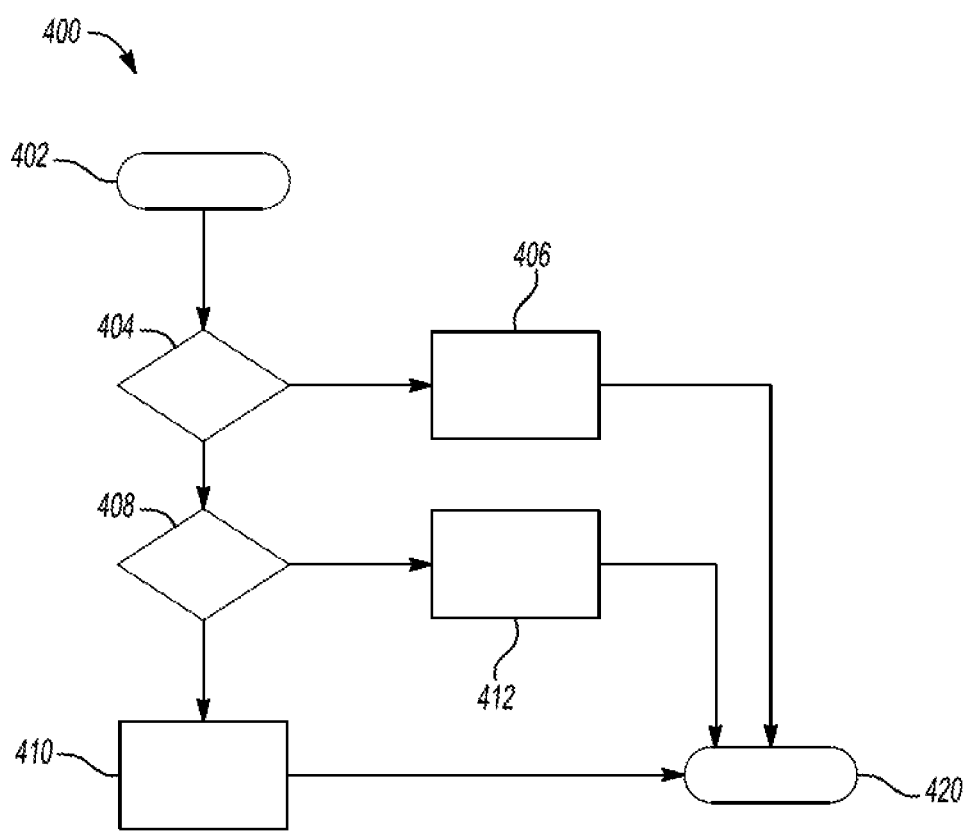
FIG. 4 is a flowchart depicting the fault mitigation algorithm in accordance with the present invention in the vehicle system of FIG. 1.

Referring to FIG. 4, a flowchart depicting exemplary steps for the fault mitigation algorithm 400 of the present invention in the vehicle system 110 of FIG. 1 is provided. The fault mitigation algorithm 400 may be stored in the power module 120 and may begin in step 402. Continuing to step 404, the algorithm determines if any associated component has set a fault (in the microprocessor 124, for example). If no component has set a fault, then the algorithm proceeds to step 406 and continues to operate normally. If it is determined that a fault has been set in step 404, then in step 408, the algorithm determines which HSD the failed component is connected to/or associated with. If the failed component is connected to/or associated with HSD2 140, the fault mitigation algorithm 400 continues to step 410 where HSD2 140 is turned off, HSD1 130 is turned on, and the vehicle system 110 operates in the first operational mode. If the failed component is connected to/or associated with HSD1 130, then the fault mitigation algorithm 400 continues to step 412 where HSD1 130 is turned off, HSD2 140 is turned on, and the vehicle system 110 operates in the second operational mode. Then in step 420, the algorithm ends. By turning off the HSD connected to/or associated with the failed component and turning on the HSD not connected to/or associated with the failed component, any undesirable effects of the failed component in the vehicle system 110 are mitigated. Although the fault mitigation algorithm 400 steps are explained using vehicle system 110 of FIG. 1, the steps of connecting HSDs to provide operational modes and then turning off HSDs associated with component failures may be used in any specific vehicle system such as the propulsion system 310 of FIG. 3, in accordance with the present invention.

Figure 5:
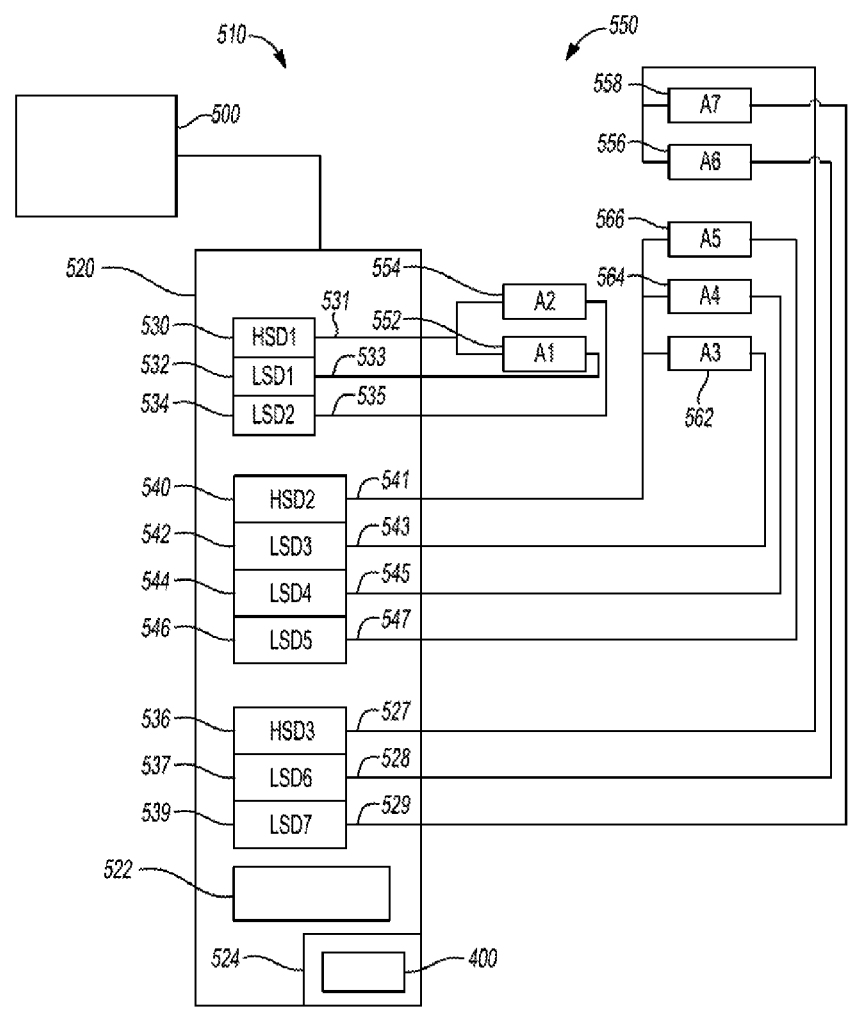
FIG. 5 is a functional block diagram of a vehicle controller and a vehicle system for an electric/hybrid vehicle including another embodiment of the system and method for providing fault mitigation in accordance with the present invention.

As shown in FIG. 5, if a third operational mode is desired, additional actuators connected to an additional HSD and associated LSDs may be added to a vehicle system 110 (FIG. 1) in accordance with another embodiment of the present invention. The vehicle controller 500 is in communication with a vehicle system 510 such as for a propulsion system, emissions systems, air management systems, or other vehicle systems. The vehicle system 510 includes a power module 520 for connecting and providing power to actuators A1 552, A2 554, A3 562, A4 564, A5 566, A6 556, A7 558 to carry out desired functions. The power module 520 includes HSD1 530 associated with LSD1 532 and LSD2 534. The power module 520 also includes HSD2 540 associated with LSD3 542, LSD4 544, and LSD5 546. The power module 520 also includes HSD3 536 associated with LSD6 537 and LSD7 539. The power module 520 may also include additional controls 522. The power module 520 includes a microprocessor 524 or central processing unit and may include fault mitigation algorithm 400 stored in Read Only Memory (ROM), Random Access Memory (RAM), electrically programmable read only memory (EPROM) or similar systems. Alternatively, fault mitigation algorithm 400 may be stored in another controller as long as it is connected for use as described here-in-below.

HSD1 530 has an output HSD1O 531 and LSD1 532 has an output LSD1O 533 enabling current to flow through A1 552 so that A1 552 is turned ON when both HSD1 530 and LSD1 532 are turned ON and current flows through HSD1O 531 and LSD1O 533 respectively. If either HSD1 530 or LSD1 532 is turned OFF, then A1 552 is accordingly turned OFF. HSD1 530 has an output HSD1O 531 and LSD2 534 has an output LSD2O 535 enabling current to flow through A2 554 so that A2 554 is turned ON when both HSD1 530 and LSD2 534 are turned ON and current flows through HSD1O 531 and LSD2O 535 respectively. If either HSD1 530 or LSD2 534 is turned OFF, then A2 554 is accordingly turned OFF.

HSD2 540 has an output HSD2O 541 and LSD3 542 has an output LSD3O 543 enabling current to flow through A3 562 so that A3 562 is turned ON when both HSD2 540 and LSD3 542 are turned ON and current flows through HSD2O 541 and LSD3O 543 respectively. If either HSD2 540 or LSD3 542 is turned OFF, then A3 562 is accordingly turned OFF. HSD2 540 has an output HSD2O 541 and LSD4 544 has an output LSD4O 545 enabling current to flow through A4 564 so that A4 564 is turned ON when both HSD2 540 and LSD4 544 are turned ON and current flows through HSD2O 541 and LSD4O 545 respectively. If either HSD2 540 or LSD4 544 is turned OFF, then A4 564 is accordingly turned OFF. HSD2 540 has an output HSD2O 541 and LSD5 546 has an output LSD5O 547 enabling current to flow through A5 566 so that A5 566 is turned ON when both HSD2 540 and LSD5 546 are turned ON and current flows through HSD2O 541 and LSD5O 547 respectively. If either HSD2 540 or LSD5 546 is turned OFF, then A5 566 is accordingly turned OFF.

HSD3 536 has an output HSD3O 527 and LSD6 537 has an output LSD6O 528 enabling current to flow through A6 556 so that A6 556 is turned ON when both HSD3 536 and LSD6 537 are turned ON and current flows through HSD3O 527 and LSD6O 528 respectively. If either HSD3 536 or LSD6 537 is turned OFF, then A6 556 is accordingly turned OFF. HSD3 536 has an output HSD3O 527 and LSD7 539 has an output LSD7O 529 enabling current to flow through A7 558 so that A7 558 is turned ON when both HSD3 536 and LSD7 539 are turned ON and current flows through HSD3O 527 and LSD7O 529 respectively. If either HSD3 536 or LSD7 539 is turned OFF, then A7 558 is accordingly turned OFF.

Still referring to FIG. 5, the vehicle system 510 includes system components 550. The system components 550 include actuators A1 552, A2 554, A3 562, A4 564, A5 566, A6 556, A7 558 for carrying out desired functions in a given system, such as engaging gears or clutches in a transmission system, or operating valves in an air management system to provide airflow or vacuum. In accordance with the present invention, the actuators A1 552 and A2 554 connected to HSD1 530 and associated LSD1 532 and LSD2 534, respectively, are selectively connected to operate in a first operational mode. Also in accordance with the present invention, the actuators A3 562, A4 564, and A5 566 connected to HSD2 540 and associated LSD3 542, LSD4 544 and LSD5 546, respectively, are selectively connected to operate in a second operational mode. Additionally, in accordance with the present invention, the actuators A6 556 and A7 558 connected to HSD3 536 and associated LSD6 537, LSD7 539, respectively, are selectively connected to operate in a third operational mode. Depending on the fault set (in the microprocessor 524, for example), the vehicle system 510 may be operated in two of the three possible operational modes as fault mitigation is designed into the vehicle system 510. It is noted that HSD1 530 may have the current rating to provide power for all of the actuators A1 552, A2 554, A3 562, A4 564, A5 566, A6 556, and A7 558 and, in a traditional vehicle system, all of the actuators may have been connected to a single HSD. However, in accordance with the present invention, the actuators A1 552 and A2 554 are selectively connected to HSD1 530 to operate in a first operational mode; the actuators A3 562, A4 564 and A5 566 are selectively connected to HSD2 540 to operate in a second operational mode; and the actuators A6 556 and A7 558 are selectively connected to HSD3 536 to operate in a third operational mode. This selection enables the fault mitigation algorithm 400 of the present invention (modified to accommodate the third HSD enabling the third operational mode) to quickly place the vehicle system 510 in a desired operational mode by turning off a specific HSD associated with an actuator, connected LSD, or associated device which sets a fault indicating a component failed.

As described throughout the above discussion, the number of HSDs used by the system and method of the present invention equals the number of operational modes desired in the event of a failed actuator. Even though additional actuators could be powered using one HSD, an additional HSD is provided so that associated actuators can be connected to different HSDs to provide different operational modes which can be achieved by switching off a selected HSD as desired. However, numerous operational modes may be managed by a subset of HSDs if the HSD quantities and connections are optimized. For example only, in a vehicle system having three HSDs, a first operational mode may have only HSD1 ON; a second operational mode may have only HSD2 ON, a third operational mode may have only HSD3 ON, a fourth operational mode may have HSD1 ON and HSD2 ON, a fifth operational mode may have HSD1 ON and HSD3 ON and a sixth operational mode may have HSD2 ON and HSD3 ON. Although having three HSDs, the vehicle system may operate in one of the multiple operational modes while having one HSD OFF, if needed, to provide fault mitigation according to the present invention.

The system and method of the present invention enables mitigation of any undesirable effects due to a failed component. By using the HSD to switch off a selected plurality of components used in the same operational mode as the failed component, rather than using associated LSDs to switch off individual actuators, a vehicle system including a failed component can be operated in an operational mode being achieved in a less complex and/or time consuming manner.

While the best modes for carrying out the invention have been described in detail, those familiar with the art to which this invention relates will recognize various alternative designs and embodiments for practicing the invention within the scope of the appended claims.

The invention claimed is:

1. A system for providing fault mitigation in a vehicle system comprising:
   a first high side driver (HSD) operable to supply power when turned on and to disconnect power when turned off;
   a plurality of first low side drivers (LSDs) associated with the first HSD;
   a selected first plurality of actuators, wherein each of the selected first plurality of actuators is connected to the first HSD and connected to a respective one of the plurality of first LSDs to receive power and operate in a first operational mode of the vehicle system;
   a second high side driver (HSD) operable to supply power when turned on and to disconnect power when turned off;
   a plurality of second low side drivers (LSDs) associated with the second HSD; and
   a selected second plurality of actuators, wherein each of the selected second plurality of actuators is connected to the second HSD and connected to a respective one of the plurality of second LSDs to receive power and operate in a second operational mode of the vehicle system;
   so that when one of the selected first plurality of actuators and respectively connected LSD sets a fault, the first HSD is turned off thereby disconnecting power to the selected first plurality of actuators and respectively connected LSDs and the second HSD is turned on, enabling the vehicle system to operate in the second operational mode; and
   so that when one of the selected second plurality of actuators and respectively connected LSD sets a fault, the second HSD is turned off thereby disconnecting power to the selected second plurality of actuators and respectively connected LSDs and the first HSD is turned on, enabling the vehicle system to operate in the first operational mode.

2. The system of claim 1 wherein the actuators are solenoids.

3. The system of claim 1 further including a plurality of associated devices, wherein each of the plurality of associated devices is operated by one of the selected first and second plurality of actuators respectively, so that when an associated device operated by one of the selected first plurality of actuators sets a fault, the first HSD is turned off thereby disconnecting power to the first plurality of actuators and the second HSD is turned on, enabling the vehicle system to operate in the second operational mode;
   and so that when an associated device operated by one of the selected second plurality of actuators sets a fault, the second HSD is turned off thereby disconnecting power to the second plurality of actuators and the first HSD is turned on, enabling the vehicle system to operate in the first operational mode.

4. The system of claim 1 wherein the vehicle system is a propulsion system.

5. The system of claim 4 wherein the first operational mode is a first gear state capable of enabling an electric/hybrid vehicle to be propelled.

6. The system of claim 4 wherein the second operational mode is a second gear state capable of enabling an electric/hybrid vehicle to be propelled.

7. The system of claim 1 further including:
   a third high side driver (HSD) operable to supply power when turned on and to disconnect power when turned off;
   a plurality of third low side drivers (LSDs) associated with the third HSD; and
   a selected third plurality of actuators, wherein each of the selected third plurality of actuators is connected to the third HSD and connected to a respective one of the plurality of third LSDs to receive power and operate in a third operational mode of the vehicle system,
   so that when one of the selected third plurality of actuators and respectively connected LSD sets a fault, the third HSD is turned off thereby disconnecting power to the selected third plurality of actuators and respectively connected LSDs and at least one of the first and second HSDs is turned on, enabling the vehicle system to operate in at least one of the first and second operational modes.

8. The system of claim 7 wherein the actuators are solenoids.

9. The system of claim 7 wherein the vehicle system is a propulsion system.

10. A method for providing fault mitigation in a vehicle system having a first high side driver (HSD) operable to supply power when turned on and to disconnect power when turned off and a plurality of first low side drivers (LSDs) and a second HSD operable to supply power when turned on and to disconnect power when turned off and a plurality of second LSDs comprising:
    connecting the first HSD to a selected first plurality of actuators, so that each actuator of the selected first plurality of actuators is connected to the first HSD and to a respective one of the plurality of first LSDs to receive power and operate in a first operational mode of the vehicle system;
    connecting the second HSD to a selected second plurality of actuators, so that each actuator of the selected second plurality of actuators is connected to the second HSD and to a respective one of the plurality of second LSDs to receive power and operate in a second operational mode of the vehicle system;
    so that when one of the selected first plurality of actuators and respectively connected LSD sets a fault, the first HSD is turned off thereby disconnecting power to the selected first plurality of actuators and respectively connected LSDs and the second HSD is turned on, enabling the vehicle system to operate in the second operational mode; and
    so that when one of the selected second plurality of actuators and respectively connected LSD sets a fault, the second HSD is turned off thereby disconnecting power to the selected second plurality of actuators and respectively connected LSDs and the first HSD is turned on, enabling the vehicle system to operate in the first operational mode.

11. The method of claim 10 wherein the actuators are solenoids.

12. The method of claim 10 further including a plurality of associated devices; wherein each of the plurality of associated devices is operated by one of the selected first and second plurality of actuators respectively, so that when an associated device operated by one of the selected first plurality of actuators sets a fault, the first HSD is turned off thereby disconnecting power to the first plurality of actuators and the second HSD is turned on; and so that when an associated device operated by one of the selected second plurality of actuators sets a fault, the second HSD is turned off thereby disconnecting power to the second plurality of actuators and the first HSD is turned on, enabling the vehicle system to operate in the first operational mode.

13. The method of claim 10 wherein the vehicle system is a propulsion system.

14. The method of claim 13 wherein the first operational mode is a first gear state capable of enabling an electric/hybrid vehicle to be propelled.

15. The method of claim 13 wherein the second operational mode is a second gear state capable of enabling an electric/hybrid vehicle to be propelled.

16. The method of claim 10 having a third high side driver (HSD) operable to supply power when turned on and to disconnect power when turned off and a plurality of third LSDs further including:

connecting the third HSD to a selected third plurality of actuators, so that each actuator of the selected third plurality of actuators is connected to the third HSD and a respective one of the plurality of third LSDs to receive power and operate in a third operational mode of the vehicle system;

so that when one of the selected third plurality of actuators and respectively connected LSD sets a fault, the third HSD is turned off thereby disconnecting power to the selected third plurality of actuators and at least one of the first and second HSDs is turned on, enabling the vehicle system to operate in at least one of the first and second operational mode.

17. The method of claim 16 wherein the actuators are solenoids.

18. An electric/hybrid vehicle including fault mitigation using high and low side drivers comprising:

a propulsion system having:
  a first high side driver (HSD) operable to supply power when turned on and to disconnect power when turned off;
  a plurality of first low side drivers (LSDs) associated with the first HSD;
  a selected first plurality of solenoids, wherein each solenoid of the selected first plurality of solenoids is connected to the first HSD and connected to a respective one of the plurality of first LSDs to receive power and operate in a first operational mode of the vehicle system;
  a second high side driver (HSD) operable to supply power when turned on and to disconnect power when turned off;
  a plurality of second low side drivers (LSDs) associated with the second HSD;
  a selected second plurality of solenoids, wherein each solenoid of the selected second plurality of solenoids is connected to the second HSD and connected to a respective one of the plurality of second LSDs to receive power and operate in a second operational mode of the vehicle system;
  so that when one of the selected first plurality of solenoids and respectively connected LSD sets a fault, the first HSD is turned off thereby disconnecting power to the selected first plurality of solenoids and respectively connected LSDs and the second HSD is turned on, enabling the vehicle system to operate in the second operational mode;
  so that when one of the selected second plurality of solenoids and respectively connected LSD sets a fault, the second HSD is turned off thereby disconnecting power to the selected second plurality of solenoids and respectively connected LSDs and the first HSD is turned on, enabling the vehicle system to operate in the first operational mode; and vehicle wheels propelled by the propulsion system.

19. The electric/hybrid vehicle of claim 18 wherein the first operational mode is a first gear state capable of enabling the electric/hybrid vehicle to be propelled.

20. The electric/hybrid vehicle of claim 18 wherein the second operational mode is a second gear state capable of enabling the electric/hybrid vehicle to be propelled.

* * * * *